United States Patent

[11] 3,537,482

| [72] | Inventor | Charles J. Rudewick |
| | | Newark, Delaware |
| [21] | Appl. No. | 786,622 |
| [22] | Filed | Dec. 24, 1968 |
| [45] | Patented | Nov. 3, 1970 |
| [73] | Assignee | Speakman Company |
| | | Wilmington, Delaware |
| | | a corporation of Delaware |

[54] RETAINER ASSEMBLY FOR FLOW CONTROL DEVICE
10 Claims, 5 Drawing Figs.

| [52] | U.S. Cl. | 138/44 |
| [51] | Int. Cl. | F15d 1/02 |
| [50] | Field of Search | 138/40, 42, 43, 44, 45, 46; 239/452 |

[56] References Cited
UNITED STATES PATENTS

| 2,939,487 | 6/1960 | Fraser et al. | 239/452X |
| 3,211,383 | 10/1965 | Aghnides | 239/452X |
| 2,923,482 | 2/1960 | Bucknell | 138/44X |

Primary Examiner—Kenneth W. Sprague
Attorney—Connolly and Hutz

ABSTRACT: Retainer assembly for releasably securing resilient flow control device in path of fluid flow through fluid conducting plumbing fixture comprising retainer body including two half portions. Fluid passageway in retainer body has inlet and discharge openings. Internal annular groove in retainer body adjacent inlet opening of fluid passageway secures resilient flow control device to retainer assembly when two half portions comprising retainer body are assembled with flow control device disposed between them.

Patented Nov. 3, 1970

3,537,482

3,537,482

1

RETAINER ASSEMBLY FOR FLOW CONTROL DEVICE

BACKGROUND OF THE INVENTION

The present invention relates to a retainer assembly, and more particularly to a retainer assembly for releasably securing a flow control device in the path of fluid flow through a fluid conducting plumbing fixture.

Many plumbing fixtures, such as showerhead balls, for example, include a removable flow control device comprising a tubular-shaped body fabricated of resilient rubber or rubber-like material. Generally, these control devices function to throttle fluid flowing through the plumbing fixture to thereby obtain uniform flow rates. Without control devices of this type pressure fluctuations or surges in the fluid supply line cause uneven flow rates through the plumbing fixture which in turn cause sporadic discharge rates.

In the prior art, the flow control device is usually mounted in a plumbing fixture by anchoring it inside the fixture with an annular retainer ring that fits around an annular groove in the control device. The outer diameter of the ring is dimensioned to engage the side walls of a bore in the fixture. The flow control device is usually positioned next to a fluid conducting passageway formed in the plumbing fixture which passageway leads to an exit or discharge orifice in the fixture. With the control device so positioned it is extremely difficult if not impossible to remove the device and its retainer ring even with special tools once they are assembled inside the fixture. Maintenance of the fixture is therefore difficult, time consuming and expensive.

Accordingly, it is an object of the present invention to avoid the above disadvantages by providing a unique retainer assembly for releasably securing a fluid control device inside a plumbing fixture which assembly makes it extremely easy to install and remove such control devices.

Another object of the present invention is to provide a retainer assembly that effectively attenuates sound generated by high velocity water flow through a flow control device retained by the assembly.

SUMMARY OF THE INVENTION

In accordance with the present invention a retainer assembly is provided for releasably securing a flow control device in the path of fluid flow through a fluid conducting plumbing fixture. The retainer assembly comprises a retainer body having two half portions and a fluid passageway in the retainer body has an inlet opening and at least one discharge opening. An internal annular groove in the retainer body adjacent the inlet opening of the fluid passageway secures a resilient flow control device to the retainer assembly when the two half portions comprising the retainer body are assembled with a flow control device disposed between them.

The retainer assembly of the present invention may include a handle connected to at least one half portion of the retainer body at the inlet opening of the fluid passageway. The handle facilitates removal of the retainer assembly from inside a plumbing fixture when such removal is desired. Moreover, the handle portion is also useful when the retainer assembly and flow control device are installed inside the plumbing fixture. Preferably, the handle has bifurcated and stem portions with the ends of the bifurcated portion connected to the retainer body at the inlet opening of the fluid passageway. The handle may be connected to each half of the retainer body at the inlet opening of the fluid passageway to facilitate removal and installation of the retainer assembly.

Moreover, the retainer assembly may include a plurality of discharge openings each of which communicates with the fluid passageway in the retainer assembly. The discharge openings are equally spaced apart and laterally arranged relative to the fluid passageway. This particular arrangement of discharge openings together with the remaining structure of the retainer assembly functions to attenuate sound as the discharge flow progresses toward the exit in the plumbing fixture within which the retainer assembly and flow control device are installed.

2

The present invention also includes the combination of the retainer assembly and a flow control device comprising a frusto-conical body with an axial passageway extending therethrough. An exterior annular projection formed at the base of the frusto-conical body is constructed and arranged to fit within the internal annular groove in the retainer body when the half portions of the retainer body are assembled with the control device disposed between them. Further, the combination may include a fluid conducting plumbing fixture, such as a showerhead ball, with an internal bore and a discharge orifice communicating with the bore. The retainer assembly and the flow control device are positioned inside the bore of the fixture. Flanges on the retainer body may be provided for engaging the side walls of the bore in the plumbing fixture.

BRIEF DESCRIPTION OF THE DRAWING

Novel features and advantages of the present invention will become apparent to one skilled in the art from a reading of the following detailed description in conjunction with the accompanying drawing wherein similar reference characters refer to similar parts and in which.

DETAILED DESCRIPTION OF THE INVENTION

Figure 1:
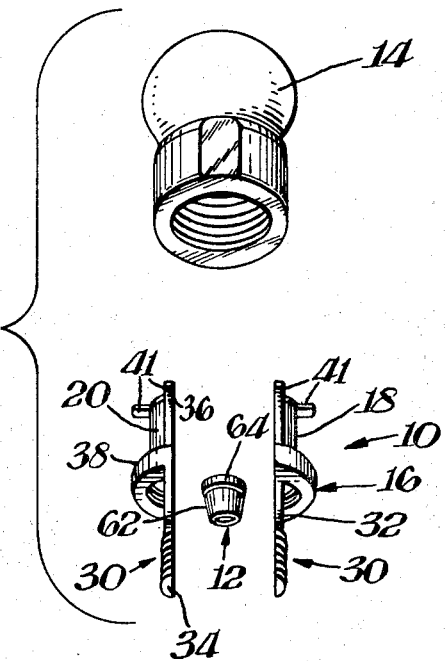
FIG. 1 is an exploded perspective view of a plumbing fixture, a flow control device, and a retainer assembly according to the present invention.
Figure 4:
FIG. 4 is a sectional view taken along line 4–4 of FIG. 2.

Referring in more particularity to the drawing, a retainer assembly 10 is provided for releasably securing a flow control device 12 in the path of fluid flow through a fluid conducting plumbing fixture, such as a showerhead ball 14. The retainer assembly 10 may be fabricated of nylon or similar material by molding techniques known in the art. Moreover, the retainer assembly includes a retainer body 16 having two identical half portions 18, 20 which together form a fluid passageway 22 in the retainer body 16. The fluid passageway has an inlet opening 24 and a plurality of discharge openings 26, as shown best in FIGS. 2 and 5. The discharge openings 26 are equally spaced apart and laterally arranged relative to the fluid passageway 22. An internal annular groove 28 is located in the retainer body 16 adjacent the inlet opening 24 for securing the flow control device 12 to the retainer assembly when the two half portions 18, 20 comprising the retainer body 16 are assembled with the flow control device 12 positioned between them.

Figure 5:
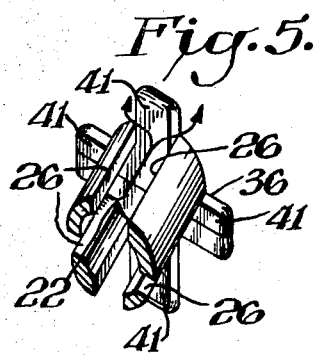
FIG. 5 is a fragmental perspective view of a retainer assembly according to the present invention.
Figure 2:
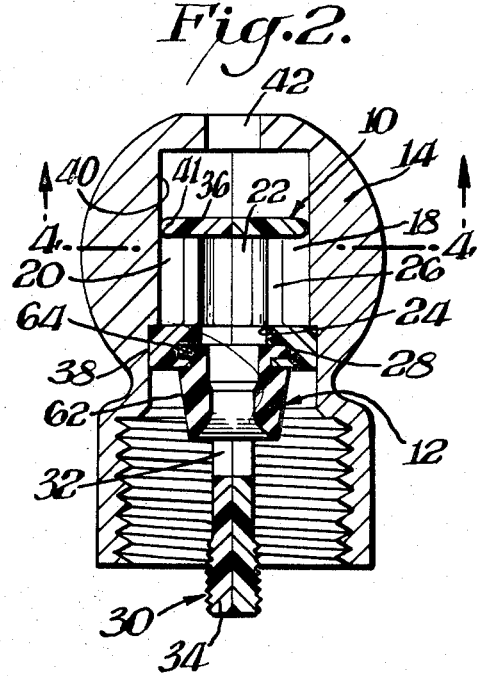
FIG. 2 is a cross-sectional view of a plumbing fixture with a retainer assembly releasably securing a flow control device inside a plumbing fixture according to the present invention.

The retainer assembly 10 also includes a handle 30 connected to each half of the retainer body 16 at the inlet opening 24 of the fluid passageway 22. As explained more fully below, the handle structure facilitates installation and removal of the retainer assembly from inside the showerhead ball 14. Each handle 30 has a bifurcated portion 32 and a stem portion 34 with the ends of the bifurcated portion connected to the retainer body 16 at the inlet opening 24 of the fluid passageway 22 in the retainer body. The retainer body 16 includes flanges 36, 38 constructed to engage the side wall of a bore 40 inside the showerhead ball 14 to anchor the retainer assembly 10 inside the showerhead ball. As shown in the drawing, the lower flange 38 is continuous and engages the side wall of the bore 40 in the showerhead ball 14, as best illustrated in FIG. 2. However, the upper flange 36 is shaped like a cross with the central portion thereof blocking the passageway 22. Also, the cross-shaped upper flange 40 has outwardly extending leg portions 41 which engage the side wall of the bore 40. Each leg portion is in line with a discharge opening at one end thereof, as best shown in FIG. 5. This arrangement causes the fluid flowing through the retainer to travel a tortuous path (as indicated by the arrows in FIG. 5) which in turn causes attenuation of undesirable sound. Finally, the showerhead ball includes a discharge orifice 42.

Figure 3:
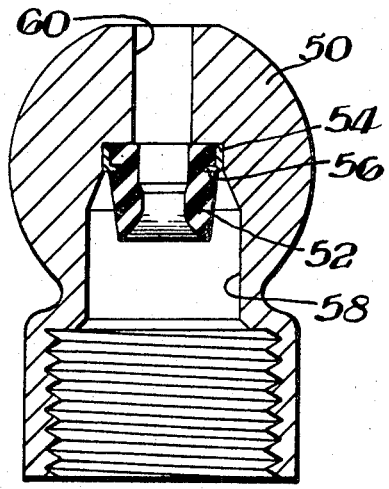
FIG. 3 is a cross-sectional view illustrating the prior art.

Turning now to the prior art arrangement illustrated in FIG. 3, a showerhead ball 50 is shown with a fluid control device 52 positioned therein by a retainer ring 54 located between an annular groove 56 in the device and the side walls of a bore 58 in the showerhead ball. Installation of the flow control device is difficult and removal of the device for maintenance purposes, even with special tools, is also troublesome.

Use of the retainer assembly 10 of the present invention is relatively easy and the flow control device 12 is easily installed or removed from the showerhead ball 14. The device 12 includes a frusto-conical body 62 with an external annular projection 64 at the base of the body arranged to fit within the internal annular groove 28 in the retainer body 16 when the half portions 18, 20 of the retainer body are assembled. The retainer assembly 10 with the flow control device anchored therein is then inserted into the bore 40 in the showerhead ball 14. The flanges 36, 38 engage the side walls of the bore to anchor the retainer body and control device inside the showerhead ball. The uniform flow rates of fluid flowing through the fixture are thereby maintained. Moreover, the construction of the showerhead ball can be relatively simple in comparison to the prior art wherein the passageway downstream of the control device is a necessary part of the fixture construction. Moreover, unlike prior art removal of the control device the present invention is a relatively simple operation. The stem portions 34 of the handles 30 are simply grasped between the fingers and a slight outward force applied thereto is sufficient to remove the retainer assembly and the flow control device.

I claim:

1. A retainer assembly for releasably securing a flow control device in the path of fluid flow through a fluid conducting plumbing fixture comprising a retainer body including two half portions, a fluid passageway in the retainer body having an inlet opening and at least one discharge opening, and an internal annular groove in the retainer body adjacent the inlet opening of the fluid passageway for securing a resilient flow control device to the retainer assembly when the two half portions comprising the retainer body are assembled with a flow control device disposed between them.

2. A retainer assembly as in claim 1 including handle means connected to at least one half portion of the retainer body at the inlet opening of the fluid passageway to facilitate removal of the retainer assembly from inside a plumbing fixture.

3. A retainer assembly as in claim 2 wherein the handle means comprises bifurcated and stem portions with the ends of the bifurcated portion connected to the retainer body at the inlet opening of the fluid passageway.

4. A retainer assembly as in claim 1 including handle means connected to each half of the retainer body at the inlet opening of the fluid passageway to facilitate removal of the retainer assembly from inside a plumbing fixture.

5. A retainer assembly as in claim 4 wherein the half portions comprising the retainer body are identically shaped.

6. A retainer assembly as in claim 1 including a plurality of discharge openings communicating with the fluid passageway.

7. A retainer assembly as in claim 6 wherein the discharge openings are equally spaced apart and laterally arranged relative to the fluid passageway.

8. A retainer assembly as in claim 1 in combination with a flow control device comprising a frusto-conical body with an axial passageway extending therethrough, an exterior annular projection formed at the base of the frusto-conical body constructed and arranged to fit within the internal annular groove in the retainer body when the half portions of the retainer body are assembled with the control device disposed between them.

9. The combination of claim 8 in further combination with a fluid conducting plumbing fixture having an internal bore with a discharge orifice communicating with the bore, the retainer assembly and the flow control device positioned inside the bore of the fixture, and flanges on the retainer body engaging the side walls of the bore inside the plumbing fixture.

10. The combination of claim 9 wherein the plumbing fixture is a showerhead ball.